United States Patent
Poppleton et al.

(10) Patent No.: US 9,301,091 B2
(45) Date of Patent: Mar. 29, 2016

(54) MEDIATION SERVER FOR A GEOPOSITIONING SERVICE IN A NETWORK

(75) Inventors: Marc Poppleton, Tonquedec (FR); Béatrice Foucault, Tregastel (FR)

(73) Assignee: Orange, Paris (FR)

( * ) Notice: Subject to any disclaimer, the term of this patent is extended or adjusted under 35 U.S.C. 154(b) by 137 days.

(21) Appl. No.: 13/977,641

(22) PCT Filed: Dec. 22, 2011

(86) PCT No.: PCT/FR2011/053162
§ 371 (c)(1),
(2), (4) Date: Jun. 28, 2013

(87) PCT Pub. No.: WO2012/089970
PCT Pub. Date: Jul. 5, 2012

(65) Prior Publication Data
US 2013/0281121 A1    Oct. 24, 2013

(30) Foreign Application Priority Data
Dec. 30, 2010    (FR) ...................................... 10 61382

(51) Int. Cl.
| | |
|---|---|
| *H04M 11/04* | (2006.01) |
| *H04W 4/02* | (2009.01) |
| *H04W 64/00* | (2009.01) |
| *H04W 24/00* | (2009.01) |
| *G08B 1/08* | (2006.01) |
| *H04W 8/08* | (2009.01) |
| *H04W 8/18* | (2009.01) |

(52) U.S. Cl.
CPC ............... *H04W 4/02* (2013.01); *H04W 64/00* (2013.01); *H04W 8/08* (2013.01); *H04W 8/18* (2013.01)

(58) Field of Classification Search
CPC ......................................................... H04W 4/02
USPC ....................................................... 455/404.2
See application file for complete search history.

(56) References Cited

U.S. PATENT DOCUMENTS

2013/0217408 A1 *    8/2013    DiFazio et al. ............ 455/456.1

FOREIGN PATENT DOCUMENTS

| EP | 2 200 357 A1 * | 6/2010 |
|---|---|---|
| WO | WO 98/52379 | 11/1998 |
| WO | WO 00/38467 | 6/2000 |
| WO | WO 01/39528 A1 * | 5/2001 |
| WO | WO 03/056853 A2 | 7/2003 |

OTHER PUBLICATIONS

International Search Report mailed May 10, 2012 for PCT/FR2011/053162 filed Dec. 22, 2011.

* cited by examiner

*Primary Examiner* — Huy C Ho
(74) *Attorney, Agent, or Firm* — Knobbe Martens Olson & Bear LLP

(57) ABSTRACT

The mediation server comprises:
  a component configured to obtain an identifier of a first terminal seeking to obtain a location for a second terminal;
  a component configured to obtain a location for the second terminal and for validating that location;
  a component configured to obtain an authorization sent by said second terminal to communicate said location of the second terminal to the first terminal; and
  a component configured to communicate said location of the second terminal to the first terminal.

11 Claims, 9 Drawing Sheets

MEDIATION SERVER FOR A GEOPOSITIONING SERVICE IN A NETWORK

RELATED APPLICATIONS

This application is the U.S. National Phase of Application No. PCT/FR2011/053162 entitled "MEDIATION SERVER FOR A GEOPOSITIONING SERVICE IN A NETWORK" filed Dec. 22, 2011, which designated the United States, and which claims the benefit of French Application No. 1061382 filed Dec. 30, 2010.

BACKGROUND OF THE INVENTION

The invention lies in the field of geolocating mobile terminals.

Nowadays, geolocating services are developing rapidly. In general, these services make it possible to provide information as a function of the geographical position of the user, thus making it possible to propose personalized services with high added value.

Numerous mobile services make it possible to obtain the location of a calling terminal or of a called terminal. The users of such services can at any time decide whether or not they desire to be visible and they must give their agreement to each request for their location.

Other known services enable users themselves to declare or modify their positions.

As a first example of the present state of the art, a geolocation solution for mobile telephony exists in which a first terminal that subscribes to a locating service can request a second terminal that also subscribes to that service to communicate its position.

That solution presents major drawbacks firstly in that it requires a subscription to the service, by both of the terminals, and secondly in that it requires the mobile terminal that is communicating its position to incorporate geolocating means.

Another solution in the present state of the art enables any terminal to use the short message service (SMS) to obtain the location of a terminal that has geolocating means. Unfortunately, those solutions are not reliable, and the location that is communicated can be erroneous.

The invention seeks to mitigate the drawbacks of present solutions by proposing a locating mechanism that enables any terminals to communicate location information that is reliable.

OBJECT AND SUMMARY OF THE INVENTION

More precisely, the present invention provides a mediation method implemented by a server in a communications network, the method comprising:
- a step of obtaining an identifier of a first terminal seeking to obtain a location for a second terminal;
- a step of obtaining a location for the second terminal and of validating this location;
- a step of obtaining an authorization sent by the second terminal to communicate the location of the second terminal to the first terminal; and
- a communication step of communicating the location of the second terminal to the first terminal.

Correspondingly, the invention also provides a mediation server in a communications network, the sever comprising:
- means for obtaining an identifier of a first terminal seeking to obtain a location for a second terminal;
- means for obtaining a location for the second terminal and for validating that location;
- means for obtaining an authorization sent by said second terminal to communicate the location of the second terminal to the first terminal; and
- means for communicating that location of the second terminal to the first terminal.

Thus, and in general manner, the invention proposes a mediation server in a telecommunications network that is suitable for obtaining the location of a terminal, for validating it, and for requesting explicit authorization from the user of that terminal before communicating it to another terminal.

The mediation server of the invention may obtain the authorization from the user of the second terminal by any means, and in particular by sending a direct message, by SMS or by using the wireless application protocol (WAP).

Thus, in a particular implementation of the mediation method of the invention, the step of obtaining the authorization includes a step of sending a request to an SMS gateway for it to send an SMS message to the second terminal, the message requesting whether the user of the second terminal desires it to communicate its real location to the first terminal.

In a particular implementation of the mediation method of the invention, the step of obtaining authorization comprises:
- a step of interrogating a capabilities server for determining whether the second terminal is suitable for implementing the WAP protocol; and if so
- a step of sending a request to an SMS gateway for it to send an enriched SMS message to the second terminal, this message requesting whether the user of the second terminal desires it to communicate its real location to the first terminal, the enriched SMS message including a link to a file including the real location of the second terminal.

In a preferred implementation, the mediation server of the invention is suitable for communicating a location for the second terminal as obtained by locating means of the second terminal, and also for obtaining the location of the second terminal from a trusted location server if the second terminal does not posses its own locating means.

Thus, in a particular implementation, the mediation method of the invention includes a step during which the mediation server verifies whether the second terminal has its own geolocating means. This verification may be performed in particular by interrogating the second terminal or by consulting a database.

In a particular implementation, when the second terminal includes its own geolocation means, the mediation method of the invention includes a step of sending a message to the second terminal to obtain a reply message including a location for the second terminal as obtained locally by the second terminal.

The reply message may include additional information, e.g. text data input by the user of the second terminal in order to specify its location.

In a particular implementation, the mediation method of the invention includes a step of obtaining the real location of the second terminal from a trusted location server.

In a preferred embodiment, the mediation server of the invention behaves like a trusted third party in that it validates the location of the second terminal as obtained locally by the second terminal itself before communicating it to the first terminal.

In a particular implementation, the mediation method of the invention includes a step of verifying the locally-obtained location and of comparing it with the real location as obtained from the trusted location server.

In a preferred implementation of the mediation method of the invention, the step of communicating the location as obtained locally by the second terminal is performed only if the locally-obtained location is verified as being valid by being compared with the real location.

The mediation server of the invention may communicate the location of the second terminal to the first terminal by any means, and in particular directly, by SMS or by using the WAP protocol.

In a preferred implementation of the mediation method of the invention, the communication step includes sending a message to the first terminal, the message including the location as obtained locally by the second terminal or the real location of the second terminal.

In a preferred implementation of the mediation method of the invention, the communication step includes sending a request to an SMS gateway for it to send a short message to the first terminal, this message including the location as obtained locally by the second terminal or the real location of the second terminal.

In a preferred implementation, the mediation method of the invention includes:
  a step of interrogating a capability server to determine whether said second terminal is suitable for implementing the WAP protocol; and if so
  the communication step includes sending a request to an SMS gateway for it to send an enriched SMS message to the first terminal, this message including a link to a file containing the location as obtained locally by the second terminal or the real location of the second terminal.

The mediation server of the invention may be addressed by the first terminal by any means, and in particular by a direct message or by SMS.

Thus, in a preferred implementation, the mediation method of the invention includes a step of receiving a request sent by the first terminal to obtain a location for the second terminal, the identifier of the second terminal being included in the request.

In a preferred implementation, this request is received by SMS.

In a particular implementation, the various steps of the mediation method of the invention are determined by computer program instructions.

Consequently, the invention also provides a computer program on a data medium, the program being suitable for being implemented by a computer, the program including instructions adapted to implementing the steps of the mediation method as mentioned above.

The program may use any programming language, and it may be in the form of source code, object code, or code intermediate between source code and object code, such as in a partially compiled form, or in any other desirable form.

The invention also provides a computer readable data medium that includes instructions of a computer program as mentioned above.

The data medium may be any entity or device capable of storing the program. For example, the medium may comprise storage means such as a read only memory (ROM), e.g. a compact disk (CD) ROM, or a microelectronic circuit ROM, or indeed magnetic recording means, e.g. a floppy disk or a hard disk.

Furthermore, the data medium may be a transmissible medium such as an electrical or optical signal, suitable for being conveyed by an electrical or optical cable, by radio, or by other means. The program of the invention may in particular be downloaded from a network of the Internet type.

Alternatively, the data medium may be an integrated circuit in which the program is incorporated, the circuit being adapted to execute or to be used in the execution of the method in question.

BRIEF DESCRIPTION OF THE DRAWINGS

Other characteristics and advantages of the present invention appear from the following description made with reference to the drawings, which show an implementation having no limiting character. In the figures.

DETAILED DESCRIPTION OF THE INVENTION

Figure 1:
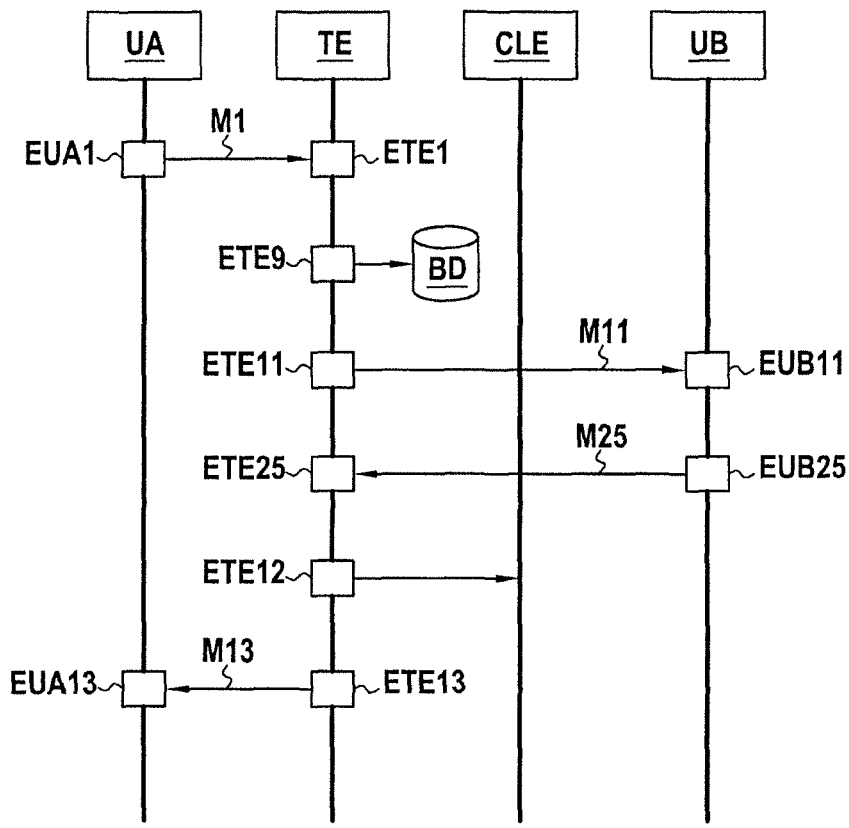
FIGS. 1 to 9 show the main steps of mediation methods in accordance with nine implementations of the invention.

FIG. 1 shows a first scenario for implementing the invention.

In this embodiment, two terminals UA and UB are configured to implement the invention.

In this embodiment, the terminal UB has its own geolocation means MPG enabling it to act locally to obtain its geolocation.

During a step EUA1, the terminal UA sends a request M1 to the server TE in order to invoke the method MOL of obtaining the location of the terminal UB. This message M1 includes the identifier of the terminal UB. It is received by the mediation server TE during a step ETE1.

During a step ETE9, the mediation server TE verifies in the database BD whether the terminal UB has its own geolocation means MPG.

If it does, the mediation server TE acts during a step ETE11 to send a request M11 to the terminal UB to request its location. This request M11 includes the identifier of the terminal UA. It is received by the terminal UB during a step EUB11.

During a step EUB25, the user of the terminal UB can decide whether to reject the request M11 without replying thereto. If the user accepts the request M11, then the terminal UB acts to obtain its location LOL (with the location being obtained locally in the meaning of the invention), by using its own geolocation means MPG, and then it sends a reply M25 to the mediation server TE, the reply including this locally-obtained location LOL.

The reply M25 may optionally be accompanied by additional information IC, e.g. text. The reply M25 is received by the mediation server TE during a step ETE25.

During a step ETE12, the mediation server TE interrogates the trusted location server CLE and verifies whether the location LOL of the terminal UB as obtained locally by the terminal UB and as contained in the message M25 is correct, by comparing it with the real location LR of the terminal UB as stored by the location server CLE.

If it is correct, then the mediation server TE sends a message M13 to the terminal UA during a step ETE13, this message including the location LOL as obtained locally by the terminal UB, optionally accompanied by additional information IC received in step ETE25. This message M13 is received by the terminal UA during a step EUA13.

Figure 2:
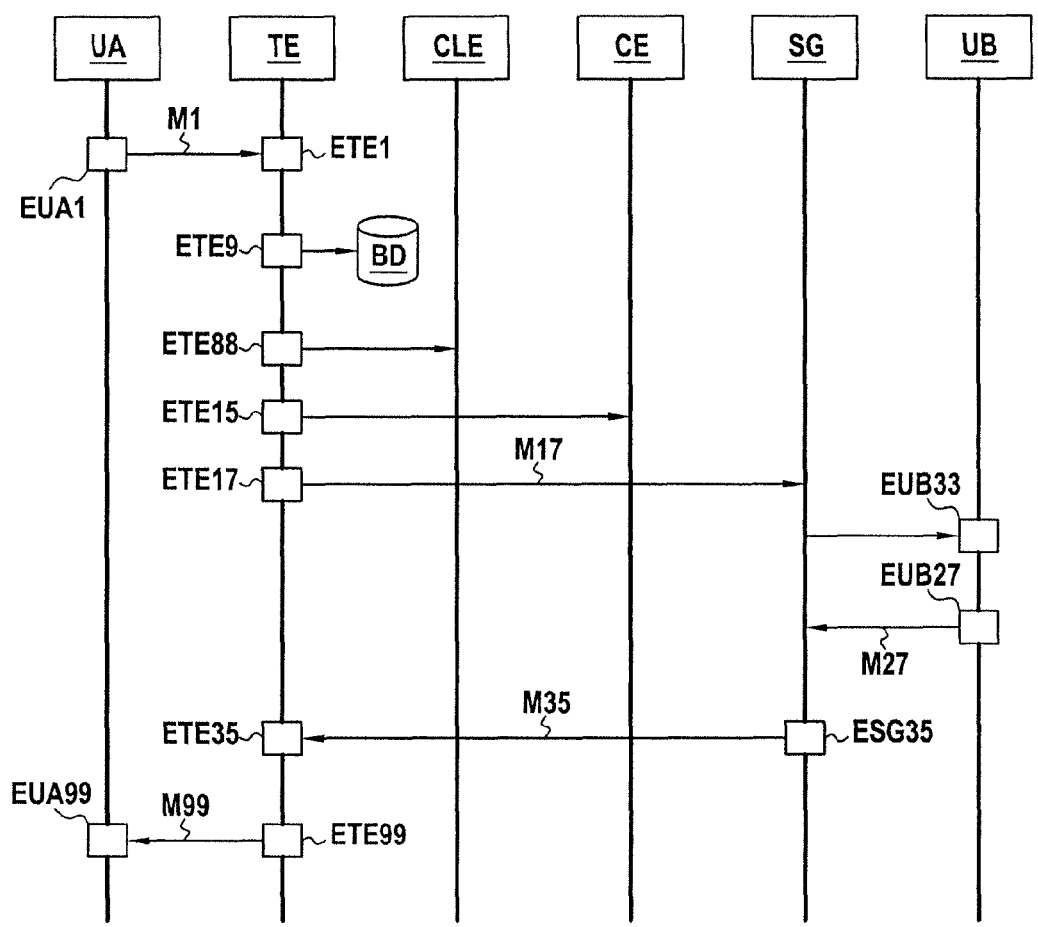

FIG. 2 shows a second scenario for implementing the invention.

In this scenario, the terminal UA is configured to implement the invention, but not the terminal UB. Furthermore, the terminal UB does not support the WAP protocol.

In this embodiment, the terminal UB does not have geolocation means enabling it to obtain its geolocation locally.

During a step EUA1, the terminal UA sends a request M1 to the server TE in order to invoke the method MOL of obtaining the location of the terminal UB. This message M1 includes the identifier of the terminal UB. It is received by the mediation server TE during a step ETE1.

During a step ETE9, the mediation server TE verifies in the database BD whether the terminal UB has its own geolocation means MPG.

If it does not, the mediation server TE interrogates the location server CLE during a step ETE88 in order to obtain the real location LR of the terminal UB.

During a step ETE15, the mediation server TE interrogates the capabilities server CE for determining whether the terminal UB is suitable for implementing the WAP protocol.

If not, the mediation server TE acts during a step ETE17 to send a request M17 to the SMS gateway SG asking it to send a short message SMS to the terminal UB, this message requesting the user of the terminal UB whether its real location LR should be communicated to the terminal UA. In the presently-described implementation, the SMS message includes the real location LR of the terminal UB as obtained by the mediation server TE from the location server CLE.

The SMS gateway SG sends the SMS to the terminal UB, which receives it during a step EUB33.

The user of the terminal UB can decide whether or not to reply to the SMS, and whether to reply in positive or negative manner.

In this implementation it is assumed that the user replies positively by acting during a step EUB27 to send a message M27 to the SMS gateway SG, this message M27 including a flag "OK" indicating the willingness of the user of the terminal UB for it to communicate its location to the terminal UA. The message M27 may possibly include additional information IC.

Since the user of the terminal UB is in agreement, the SMS gateway SG acts during a step ESG35 to send a message M35 to the server TE in order to invoke the method MOL of obtaining the location of the terminal UB. This message M35 includes the identifier of the terminal UB and possibly also additional information IC. It is received by the mediation server TE during a step ETE35.

Thereafter, the mediation server TE sends a message M99 to the terminal TA during a step ETE99, this message including the real location LR of the terminal UB accompanied with the additional information IC, if any, received in step ETE35. This message M99 is received by the terminal UA during a step EUA99.

Figure 3:
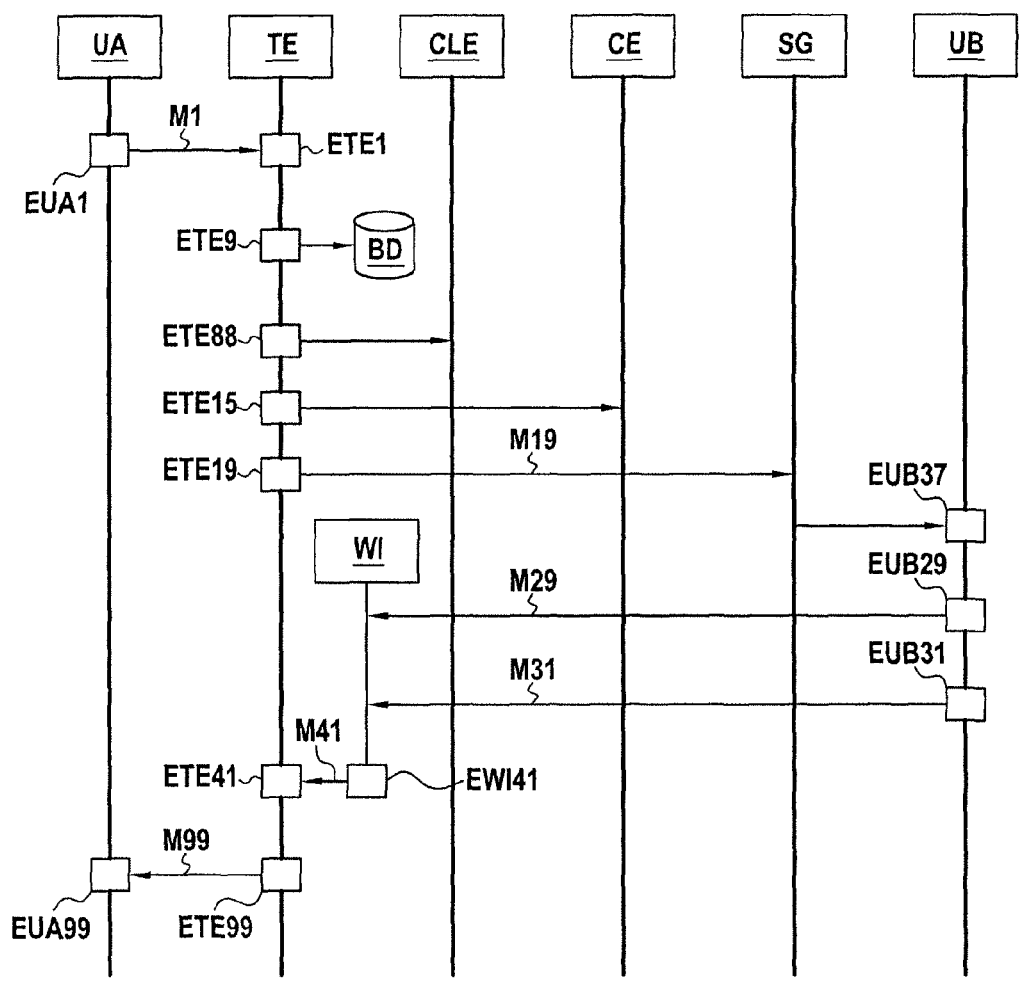

FIG. 3 shows a third scenario for implementing the invention.

In this scenario, the terminal UA is configured to implement the invention, but not the terminal UB. The terminal UB supports the WAP protocol.

In this embodiment, the terminal UB does not have geolocation means enabling it to obtain its geolocation locally.

During a step EUA1, the terminal UA sends a request M1 to the server TE in order to invoke the method MOL of obtaining the location of the terminal UB. This message M1 includes the identifier of the terminal UB. It is received by the mediation server TE during a step ETE1.

During a step ETE9, the mediation server TE verifies in the database BD whether the terminal UB has its own geolocation means MPG.

If it does not, the mediation server TE interrogates the location server CLE during a step ETE88 in order to obtain the real location LR of the terminal UB.

During a step ETE15, the mediation server TE interrogates the capabilities server CE for determining whether the terminal UB is suitable for implementing the WAP protocol.

If so, the mediation server TE acts during a step ETE19 to send a request M19 to the SMS gateway SG asking it to send an enriched SMS message to the terminal UB, this message asking the user of the terminal UB whether its real location LR should be communicated to the terminal UA. In the presently-described implementation, the enriched SMS message includes a link LLR to a file including the real location LR of the terminal UB as obtained by the mediation server TE from the location server CLE.

The SMS gateway SG sends the enriched SMS to the terminal UB which receives it during a step EUB37.

The user of the terminal UB can decide whether or not to reply to the enriched SMS, and whether to reply thereto in positive or negative manner.

In this implementation it is assumed that the user clicks on the link LLR during a step EUB29 and accesses a WAP interface IW of the server TE. This interface enables a WAP page to be downloaded giving the real location LR of the terminal UB, a link giving the user of the terminal UB the option of accepting or refusing that its real location be communicated to the terminal TA, and an input zone optionally serving to receive additional information IC that is to be communicated to the terminal TA.

In this implementation, it is assumed that the user of the terminal UB seeks to communicate its real location LR to the terminal TA and interacts with the WAP page in order to send a message M31 including additional information IC to the WAP interface IW of the server TE during a step EUB31.

Since the user of the terminal UB has agreed, the WAP interface IW acts during a step EWI41 to send a command M41 to the server TE, this command M41 including the identifier of the terminal UB and optionally additional information IC. It is received by the mediation server TE during a step ETE41.

Thereafter, the mediation server TE sends a message M99 to the terminal TA during a step ETE99, this message including the real location LR of the terminal UB accompanied with the additional information IC, if any, as received by the WAP interface IW in step ETE41. This message M99 is received by the terminal UA during a step EUA99.

Figure 4:
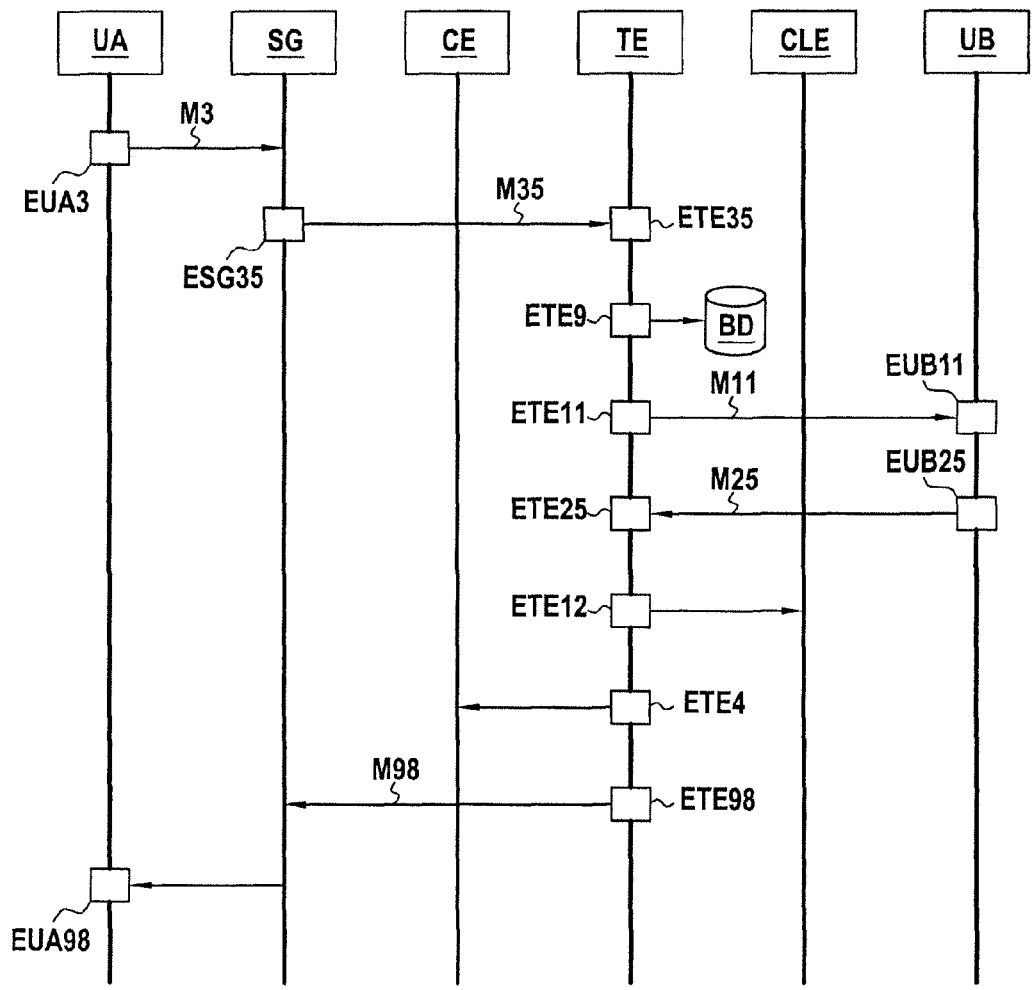

FIG. 4 shows a fourth scenario for implementing the invention.

In this scenario, neither the terminal UA nor the terminal UB is configured to implement the invention. These terminals are not suitable for implementing the WAP protocol.

In this embodiment, the terminal UB has its own geolocation means MPG enabling it to act locally to obtain its geolocation.

During a step EUA3, the terminal UA sends a message M3 to the SMS gateway SG, this message including a key word KW and the identifier of the terminal UB.

On receiving this message, the SMS gateway SG detects the key word KW and acts during a step ESG35 to send a message M35 to the server TE in order to invoke the method MOL of obtaining the location of the terminal UB. This message M35 includes the identifier of the terminal UB. It is received by the mediation server TE during a step ETE35.

During a step ETE9, the mediation server TE verifies in the database BD whether the terminal UB includes its own geolocation means MPG.

If it does, the mediation server TE acts during a step ETE11 to send a request M11 to the terminal UB to request its location. This request M11 includes the identifier of the terminal UA. It is received by the terminal UB during a step EUB11.

During a step EUB25, the user of the terminal UB can decide whether to reject the request M11 without replying thereto. If the user accepts the request M11, then the terminal UB acts to obtain its location LOL (with the location being obtained locally in the meaning of the invention), by using its own geolocation means MPG, and then it sends a reply M25 to the mediation server TE, the reply including this locally-obtained location LOL. This reply is received by the mediation server TE during a step ETE25.

During a step ETE12, the mediation server TE interrogates the trusted location server CLE and verifies whether the location LOL of the terminal UB as obtained locally by the terminal UB and as contained in the message M25 is correct, by comparing it with the real location LR of the terminal UB as stored by the location server CLE. It is assumed that this is so.

During a step ETE4, the mediation server TE interrogates the capabilities server CE to determine whether the terminal UA is suitable for implementing the WAP protocol.

If not, the mediation server TE acts during a step ETE98 to send a request M98 to the SMS gateway SG for it to send an SMS short message to the terminal UA, this message including the location LOL as obtained locally by the terminal UB, possibly together with additional information IC.

The SMS gateway SG sends this message to the terminal UA which receives it during a step EUA98.

Figure 5:
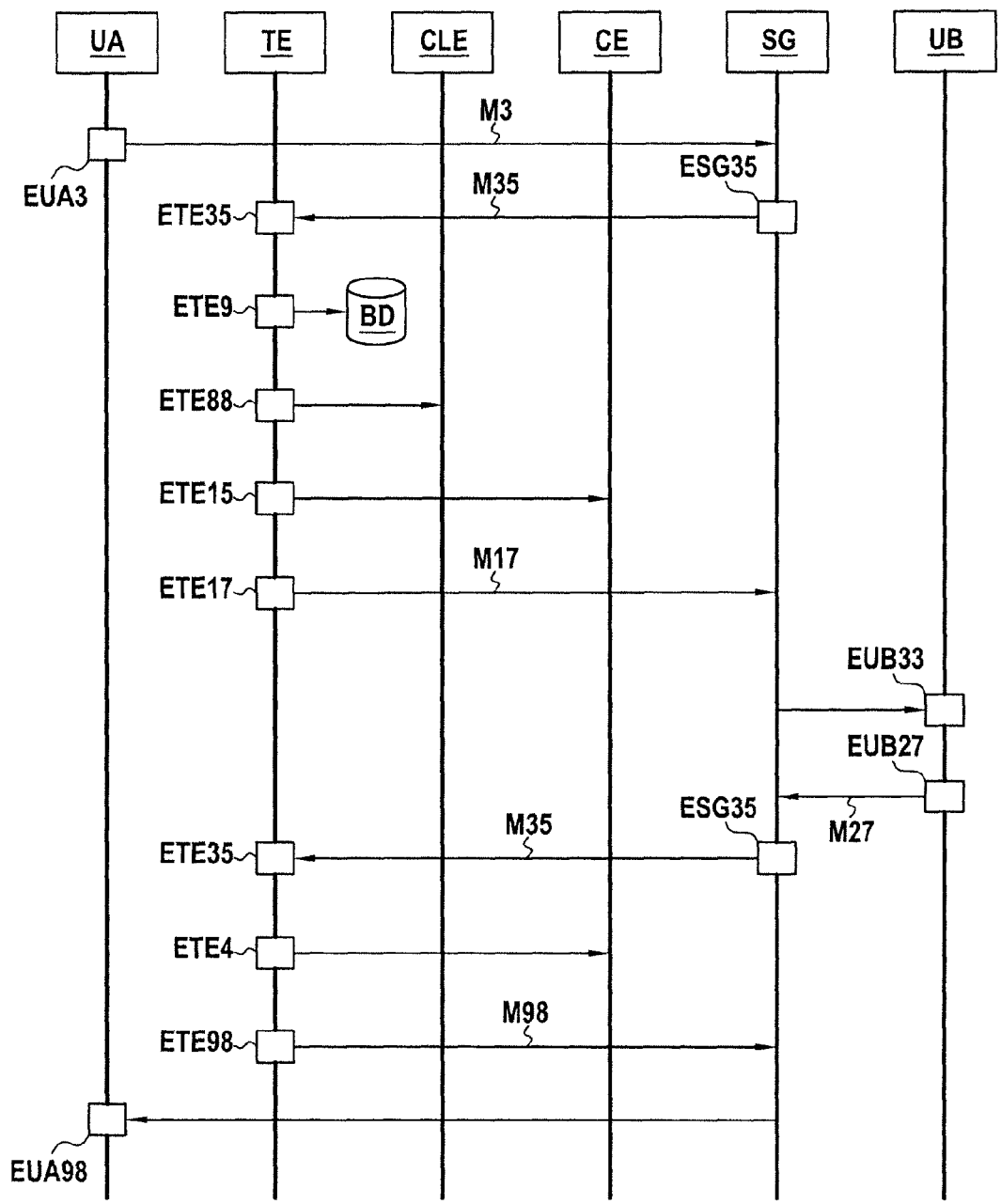

FIG. 5 shows a fifth scenario for implementing the invention.

In this scenario, the terminal UB is configured to implement the invention, but not the terminal UA. Neither the terminal UA nor the terminal UB is suitable for implementing the WAP protocol.

In this embodiment, the terminal UB does not have geolocation means enabling it to obtain its geolocation locally.

During a step EUA3, the terminal UA sends a message M3 to the SMS gateway SG, this message including a key word KW and the identifier of the terminal UB.

On receiving this message, the SMS gateway SG detects the key word KW and acts during a step ESG35 to send a message M35 to the server TE in order to invoke the method MOL of obtaining the location of the terminal UB. This message M35 includes the identifier of the terminal UB. It is received by the mediation server TE during a step ETE35.

During a step ETE9, the mediation server TE verifies in the database BD whether the terminal UB includes its own geolocation means MPG.

If it does not, the mediation server TE interrogates the location server CLE during a step ETE88 in order to obtain the real location LR of the terminal UB.

During a step ETE15, the mediation server TE interrogates the capabilities server CE for determining whether the terminal UB is suitable for implementing the WAP protocol.

If not, the mediation server TE acts during a step ETE17 to send a request M17 to the SMS gateway SG asking it to send a short message SMS to the terminal UB, this message requesting the user of the terminal UB whether its real location LR should be communicated to the terminal UA. In the presently-described implementation, the SMS message includes the real location LR of the terminal UB as obtained by the mediation server TE from the location server CLE.

The SMS gateway SG sends the SMS to the terminal UB, which receives it during a step EUB33.

The user of the terminal UB can decide whether or not to reply to the SMS, and whether to reply in positive or negative manner.

In this implementation it is assumed that the user replies positively by acting during a step EUB27 to send a message M27 to the SMS gateway SG, this message M27 including a flag "OK" indicating the willingness of the user of the terminal UB for it to communicate its location to the terminal UA. The message M27 may possibly include additional information IC.

Since the user of the terminal UB is in agreement, the SMS gateway SG acts during a step ESG35 to send a message M35 to the server TE in order to invoke the method MOL of obtaining the location of the terminal UB. This message M35 includes the identifier of the terminal UB and possibly also additional information IC. It is received by the mediation server TE during a step ETE35.

During a step ETE4, the mediation server TE interrogates the capabilities server CE to determine whether the terminal UA is suitable for implementing the WAP protocol.

If not, the mediation server TE acts during a step ETE98 to send a request M98 to the SMS gateway SG for it to send an SMS short message to the terminal UA, this message including the location LOL of the terminal UB as obtained locally by the terminal UB, possibly together with additional information IC.

The SMS gateway SG sends this message to the terminal UA which receives it during a step EUA98.

Figure 6:
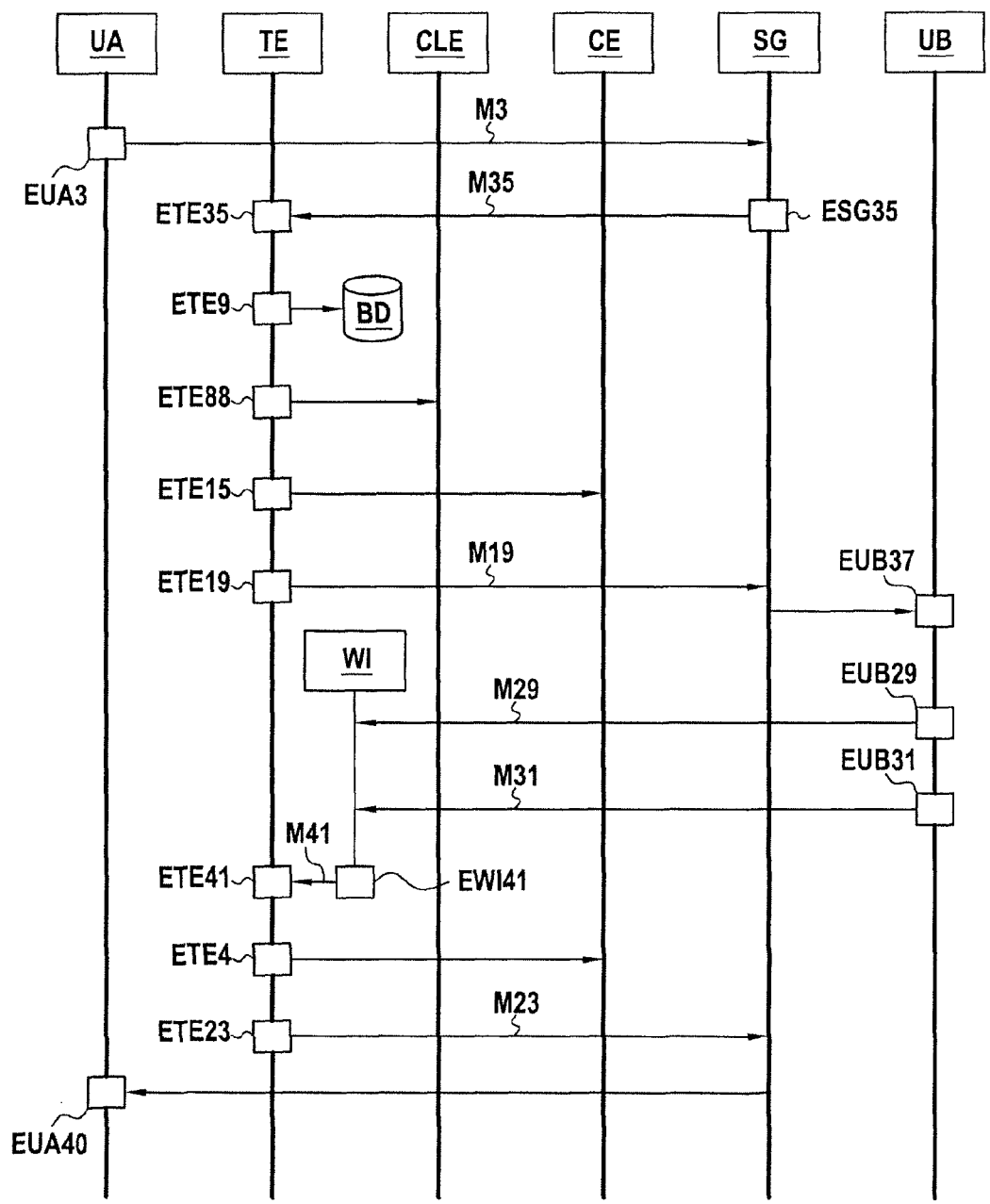

FIG. 6 shows a sixth scenario for implementing the invention.

In this scenario, the terminal UB is configured to implement the invention, but not the terminal UA. The terminal UB is suitable for implementing the WAP protocol, but not the terminal UA.

In this embodiment, the terminal UB does not have geolocation means enabling it to obtain its geolocation locally.

During a step EUA3, the terminal UA sends a message M3 to the SMS gateway SG, this message including a key word KW and the identifier of the terminal UB.

On receiving this message, the SMS gateway SG detects the key word KW and acts during a step ESG35 to send a message M35 to the server TE in order to invoke the method MOL of obtaining the location of the terminal UB. This message M35 includes the identifier of the terminal UB. It is received by the mediation server TE during a step ETE35.

During a step ETE9, the mediation server TE verifies in the database BD whether the terminal UB includes its own geolocation means MPG.

If it does not, the mediation server TE interrogates the location server CLE during a step ETE88 in order to obtain the real location LR of the terminal UB.

During a step ETE15, the mediation server TE interrogates the capabilities server CE for determining whether the terminal UB is suitable for implementing the WAP protocol.

If so, the mediation server TE acts during a step ETE19 to send a request M19 to the SMS gateway SG asking it to send an enriched SMS message to the terminal UB, this message asking the user of the terminal UB whether its real location LR should be communicated to the terminal UA. In the presently-described implementation, the enriched SMS message includes a link LLR to a file including the real location LR of the terminal UB as obtained by the mediation server TE from the location server CLE.

The SMS gateway SG sends the enriched SMS to the terminal UB which receives it during a step EUB37.

The user of the terminal UB can decide whether or not to reply to the enriched SMS, and whether to reply thereto in positive or negative manner.

In this implementation it is assumed that the user clicks on the link LLR during a step EUB29 and accesses a WAP interface IW of the server TE. This interface enables a WAP page to be downloaded giving the real location LR of the terminal UB, a link giving the user of the terminal UB the option of accepting or refusing that its real location be communicated to the terminal TA, and an input zone optionally serving to receive additional information IC that is to be communicated to the terminal TA.

In this implementation, it is assumed that the user of the terminal UB seeks to communicate its real location LR to the terminal TA and interacts with the WAP page in order to send a message M31 including additional information IC to the WAP interface IW of the server TE during a step EUB31.

Since the user of the terminal UB has agreed, the WAP interface IW acts during a step EWI41 to send a command M41 to the server TE, to invoke the method MOL of obtaining the location of the terminal UB. This command M41 includes the identifier of the terminal UB and optionally additional information IC. It is received by the mediation server TE during a step ETE41.

During a step ETE4, the mediation server TE interrogates the capabilities server CE to determine whether the terminal UA is suitable for implementing the WAP protocol.

If not, the mediation server TE acts during a step ETE23 to send a request M23 to the SMS gateway SG asking it to send an SMS short message to the terminal UA, this message including the real location LR of the terminal UB as obtained by the mediation server TE from the location server CLE, possibly together with additional information IC.

The SMS gateway SG sends this message to the terminal UA which receives it during a step EUA40.

Figure 7:
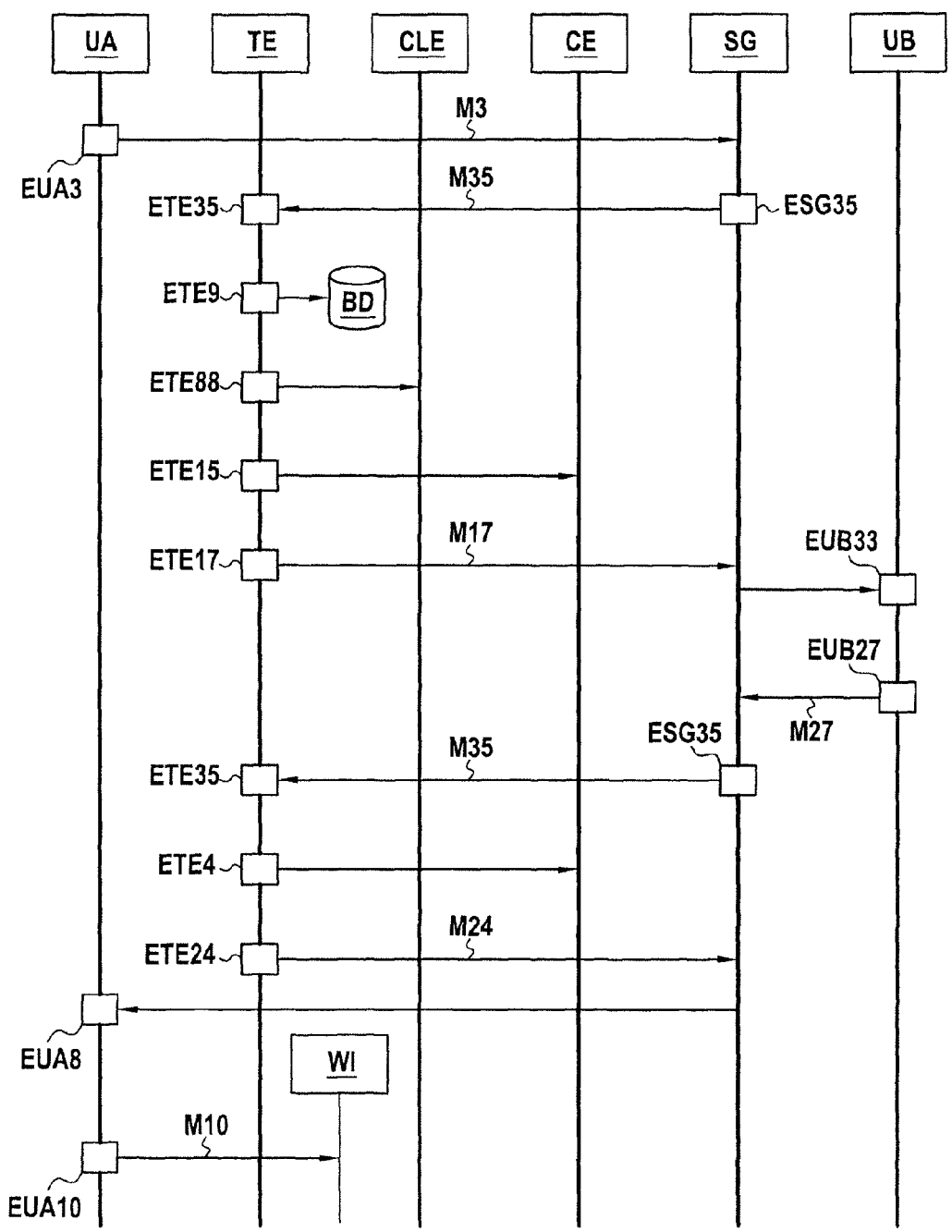

FIG. 7 shows a seventh scenario for implementing the invention.

In this scenario, neither the terminal UA nor the terminal UB is configured to implement the invention. The terminal UA is suitable for implementing the WAP protocol, but not the terminal UB.

In this embodiment, the terminal UB does not have geolocation means enabling it to obtain its geolocation locally.

During a step EUA3, the terminal UA sends a message M3 to the SMS gateway SG, this message including a key word KW and the identifier of the terminal UB.

On receiving this message, the SMS gateway SG detects the key word KW and acts during a step ESG35 to send a message M35 to the server TE in order to invoke the method MOL of obtaining the location of the terminal UB. This message M35 includes the identifier of the terminal UB. It is received by the mediation server TE during a step ETE35.

During a step ETE9, the mediation server TE verifies in the database BD whether the terminal UB includes its own geolocation means MPG.

If it does not, the mediation server TE interrogates the location server CLE during a step ETE88 in order to obtain the real location LR of the terminal UB.

During a step ETE15, the mediation server TE interrogates the capabilities server CE for determining whether the terminal UB is suitable for implementing the WAP protocol.

If not, the mediation server TE acts during a step ETE17 to send a request M17 to the SMS gateway SG asking it to send a short message SMS to the terminal UB, this message requesting the user of the terminal UB whether its real location LR should be communicated to the terminal UA. In the presently-described implementation, the SMS message includes the real location LR of the terminal UB as obtained by the mediation server TE from the location server CLE.

The SMS gateway SG sends the SMS to the terminal UB, which receives it during a step EUB33.

The user of the terminal UB can decide whether or not to reply to the SMS, and whether to reply in positive or negative manner.

In this implementation it is assumed that the user replies positively by acting during a step EUB27 to send a message M27 to the SMS gateway SG, this message M27 including a flag "OK" indicating the willingness of the user of the terminal UB for it to communicate its location to the terminal UA. The message M27 may possibly include additional information IC.

Since the user of the terminal UB is in agreement, the SMS gateway SG acts during a step ESG35 to send a message M35 to the server TE, this message M35 including the identifier of the terminal UB and possibly also additional information IC. It is received by the mediation server TE during a step ETE35.

During a step ETE4, the mediation server TE interrogates the capabilities server CE to determine whether the terminal UA is suitable for implementing the WAP protocol.

If so, during a step ETE24, the mediation server TE sends a request M24 to the SMS gateway SG asking it to send an enriched SMS message to the terminal UA, this message including a link LLR2 to a file containing the real location LR of the terminal UB as obtained by the mediation server TE from the location server CLE.

The SMS gateway SG sends the enriched SMS to the terminal UA which receives it during a step EUA8.

In this implementation, it is assumed that the user of the terminal UA clicks on the link LLR2 during a step EUA10 and accesses a WAP interface IW of the server TE. This interface allows a WAP page to be downloaded that presents the real location LR of the terminal UB.

Figure 8:
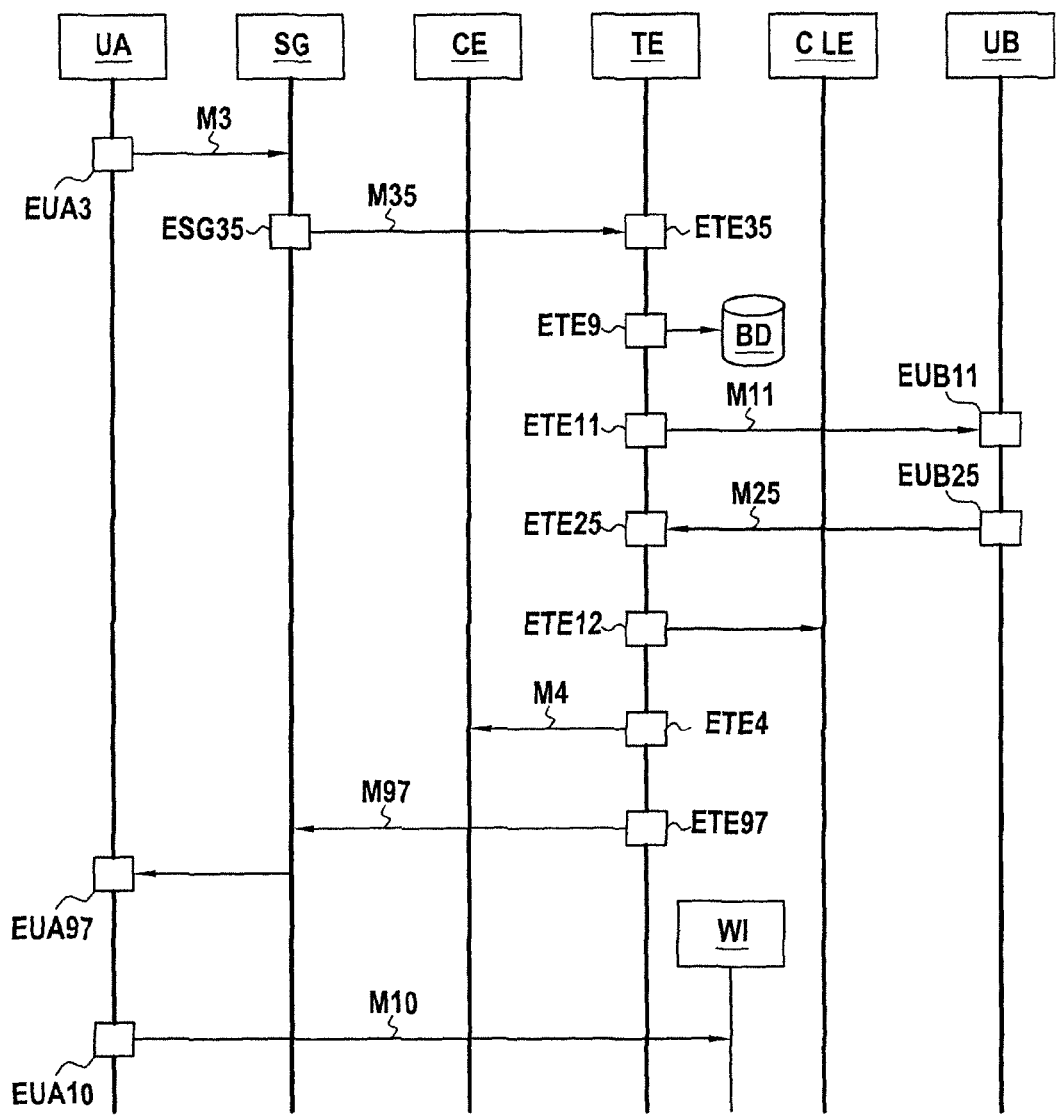

FIG. 8 shows an eighth scenario for implementing the invention.

In this scenario, the terminal UB is configured to implement the invention, but not the terminal UA. The terminal UA is suitable for implementing the WAP protocol, but not the terminal UB.

In this embodiment, the terminal UB has its own geolocation means MPG enabling it to act locally to obtain its geolocation.

During a step EUA3, the terminal UA sends a message M3 to the SMS gateway SG, this message including a key word KW and the identifier of the terminal UB.

On receiving this message, the SMS gateway SG detects the key word KW and acts during a step ESG35 to send a message M35 to the server TE in order to invoke the method MOL of obtaining the location of the terminal UB. This message M35 includes the identifier of the terminal UB. It is received by the mediation server TE during a step ETE35.

During a step ETE9, the mediation server TE verifies in the database BD whether the terminal UB includes its own geolocation means MPG.

If it does, the mediation server TE acts during a step ETE11 to send a request M11 to the terminal UB to request its location. This request M11 includes the identifier of the terminal UA. It is received by the terminal UB during a step EUB11.

During a step EUB25, the user of the terminal UB can decide whether to reject the request M11 without replying thereto. If the user accepts the request M11, then the terminal UB acts to obtain its location LOL (with the location being obtained locally in the meaning of the invention), by using its own geolocation means MPG, and then it sends a reply M25 to the mediation server TE, the reply including this locally-obtained location LOL. The reply M25 may optionally be accompanied by additional information IC, e.g. text. This reply M25 is received by the mediation server TE during a step ETE25.

During a step ETE12, the mediation server TE interrogates the trusted location server CLE and verifies whether the location LOL as obtained locally by the terminal UB and as contained in the message M25 is correct, by comparing it with the real location LR of the terminal UB as stored by the location server CLE. It is assumed that this is so.

During a step ETE4, the mediation server TE interrogates the capabilities server CE to determine whether the terminal UA is suitable for implementing the WAP protocol.

If so, the mediation server TE acts during a step ETE97 to send a request M97 to the SMS gateway SG for it to send an enriched SMS message to the terminal UA, this message including a link LLR3 to a file containing the location LOL that has been obtained for the terminal UB.

The SMS gateway SG sends the enriched SMS to the terminal UA which receives it during a step EUA97.

In this implementation, it is assumed that the user of the terminal UA clicks on the link LLR2 during a step EUA10 and accesses a WAP interface IW of the server TE. This interface allows a WAP page to be downloaded that presents the announced location LOL of the terminal UB.

Figure 9:
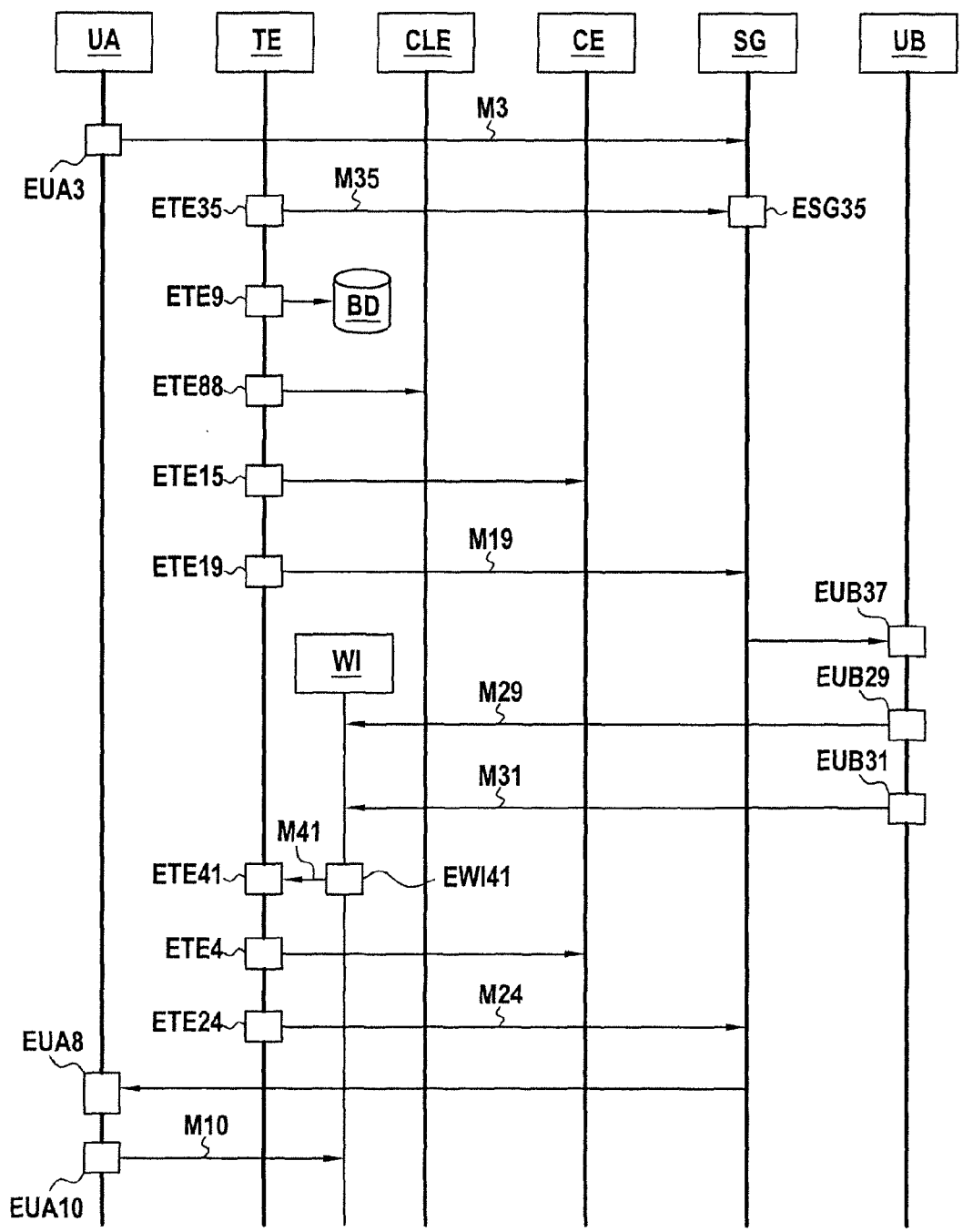

FIG. 9 shows a ninth scenario for implementing the invention.

In this scenario, neither the terminal UA nor the terminal UB is configured to implement the invention. The terminals UA and UB are suitable for implementing the WAP protocol.

In this embodiment, the terminal UB does not have geolocation means enabling it to obtain its geolocation locally.

During a step EUA3, the terminal UA sends a message M3 to the SMS gateway SG, this message including a key word KW and the identifier of the terminal UB.

On receiving this message, the SMS gateway SG detects the key word KW and acts during a step ESG35 to send a message M35 to the server TE in order to invoke the method MOL of obtaining the location of the terminal UB. This message M35 includes the identifier of the terminal UB. It is received by the mediation server TE during a step ETE35.

During a step ETE9, the mediation server TE verifies in the database BD whether the terminal UB includes its own geolocation means MPG.

If it does not, the mediation server TE interrogates the location server CLE during a step ETE88 in order to obtain the real location LR of the terminal UB.

During a step ETE15, the mediation server TE interrogates the capabilities server CE for determining whether the terminal UB is suitable for implementing the WAP protocol.

If so, the mediation server TE acts during a step ETE19 to send a request M19 to the SMS gateway SG asking it to send an enriched SMS message to the terminal UB, this message asking the user of the terminal UB whether its real location LR should be communicated to the terminal UA. In the presently-described implementation, the enriched SMS message includes a link LLR to a file including the real location LR of the terminal UB as obtained by the mediation server TE from the location server CLE.

The SMS gateway SG sends the enriched SMS to the terminal UB which receives it during a step EUB37.

The user of the terminal UB can decide whether or not to reply to the enriched SMS, and whether to reply thereto in positive or negative manner.

In this implementation it is assumed that the user clicks on the link LLR during a step EUB29 and accesses a WAP interface IW of the server TE. This interface enables a WAP page to be downloaded giving the real location LR of the terminal UB, a link giving the user of the terminal UB the option of accepting or refusing that its real location be communicated to the terminal TA, and an input zone optionally serving to receive additional information IC that is to be communicated to the terminal TA.

In this implementation, it is assumed that the user of the terminal UB seeks to communicate its real location LR to the terminal TA and interacts with the WAP page in order to send a message M31 including additional information IC to the WAP interface IW of the server TE during a step EUB31.

Since the user of the terminal UB has agreed, the WAP interface IW acts during a step EWI41 to send a command M41 to the server TE, in order to invoke the method MOL of obtaining the location of the terminal UB. This command M41 includes the identifier of the terminal UB, and optionally additional information IC. It is received by the mediation server TE during a step ETE41.

During a step ETE4, the mediation server TE interrogates the capabilities server CE to determine whether the terminal UA is suitable for implementing the WAP protocol.

If so, during a step ETE24, the mediation server TE sends a request M24 to the SMS gateway SG asking it to send an enriched SMS message to the terminal UA, this message including a link LLR2 to a file containing the real location LR of the terminal UB as obtained by the mediation server TE from the location server CLE.

The SMS gateway SG sends the enriched SMS to the terminal UA which receives it during a step EUA8.

In this implementation, it is assumed that the user of the terminal UA clicks on the link LLR2 during a step EUA10 and accesses a WAP interface IW of the server TE. This interface allows a WAP page to be downloaded that presents the real location LR of the terminal UB.

Figure 10:
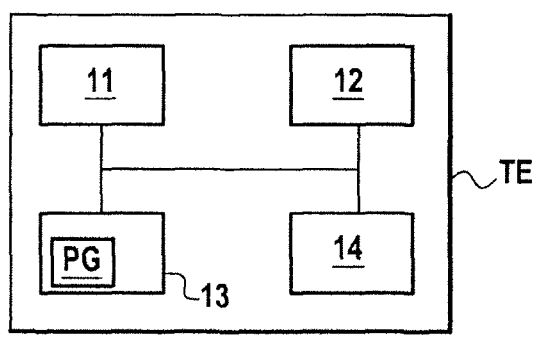
FIG. 10 is a diagram showing a mediation server in accordance with a particular embodiment of the invention.

FIG. 10 is a diagram showing a mediation server TE in accordance with a particular embodiment of the invention.

In the embodiment described herein, the server TE has the hardware architecture of a computer. In particular, it comprises a processor 11, a random access memory (RAM) 12, ROM 13, and communications means 14.

The ROM 13 constitutes a storage medium in accordance with the invention. This storage medium is readable by the processor 11 and it stores a computer program PG including instructions for implementing a mediation method in accordance with the invention, the main steps ETExx of that method being described above with reference to FIGS. 1 to 9 representing nine implementations.

The processor 11, the memories 12 and 13, the computer program PG, and the communications means 14 constitute in particular:

means for obtaining an identifier of a first terminal UA seeking to obtain a location for a second terminal UB;

means for obtaining a location LOL or LR for the second terminal UB and for validating that location;

means for obtaining an authorization sent by said second terminal UB to communicate the location LOL or LR of the second terminal UB to the first terminal UA; and means for communicating that location LOL or LR of the second terminal UB to the first terminal UA.

The invention claimed is:

1. A mediation method implemented by a mediation server in a communications network, the method comprising:

obtaining by said mediation server an identifier of a first terminal seeking to obtain a location for a second terminal;

verifying by said mediation server whether said second terminal is configured to determine its own geolocation; and if so:
obtaining by said mediation server a location obtained locally in the second terminal;
verifying by said mediation server said locally-obtained location, by comparing it with a real location of said second terminal obtained by said mediation server from a trusted location server; and
communicating said locally-obtained location of the second terminal to the first terminal if said locally obtained location is verified as being valid.

2. The mediation method according to claim 1, wherein, when said second terminal includes its own geolocation component, the method includes sending a message to said second terminal to obtain a reply message comprising a location of the second terminal as obtained locally by said second terminal.

3. The mediation method according to claim 2 wherein said reply message comprises additional information.

4. The mediation method according to claim 1, comprising receiving a request sent by said first terminal to obtain a location for said second terminal, the identifier of said second terminal being included in said request.

5. The mediation method according to claim 4, wherein said request is received by SMS.

6. The mediation method according to claim 1, further comprising if said second terminal is not configured to determine its own geolocation, communicating a real location of said second terminal to the first terminal.

7. The mediation method according to claim 1, wherein said communication comprises sending a request to an SMS gateway for it to send an SMS message to the first terminal, and this message comprises the location as obtained locally by the second terminal or the real location of said second terminal.

8. The mediation method according to claim 1, comprising:
interrogating a capability server to determine whether said first terminal is suitable for implementing the WAP protocol; and if so
said communication comprises sending a request to an SMS gateway for it to send an enriched SMS message to the first terminal, this message comprising a link to a file containing said location as obtained locally by said second terminal or said real location of the second terminal.

9. A non-transitory computer-readable storage medium having stored thereon a computer program comprising instructions for executing the mediation method according to claim 1.

10. A computer having stored thereon a program comprising instructions for executing the mediation method according to claim 1 when said program is executed by said computer.

11. A mediation server in a communications network, the sever comprising:
a processor and a memory, wherein said mediation server is configured to:
obtain an identifier of a first terminal seeking to obtain a location for a second terminal;
verify whether said second terminal is configured to determine its own geolocalisation;
obtain a localization obtained locally in the second terminal;
verify said locally-obtained location, by comparing it with a real location of said second terminal obtained from a trusted location server; and
communicate said locally-obtained location of the second terminal to the first terminal if said locally obtained location is verified as being valid.

* * * * *